United States Patent
Miyake

[11] 3,947,624
[45] Mar. 30, 1976

[54] SYSTEM FOR CONDUCTING A TELEVISION AUDIENCE SURVEY

[75] Inventor: Nobuo Miyake, Yokohama, Japan

[73] Assignee: Totsu Co. Ltd., Tokyo, Japan

[22] Filed: Nov. 1, 1974

[21] Appl. No.: 520,049

[30] Foreign Application Priority Data
Mar. 8, 1974 Japan............................ 49-026232

[52] U.S. Cl. ................ 178/6; 178/DIG. 13; 375/31
[51] Int. Cl.² ........................................... H04N 7/02
[58] Field of Search................. 178/DIG. 13, 6, 6.8; 325/31

[56] References Cited
UNITED STATES PATENTS

| | | | |
|---|---|---|---|
| 2,674,512 | 4/1956 | Bogert | 325/31 |
| 3,483,327 | 12/1969 | Schwartz | 178/DIG. 13 |
| 3,524,015 | 8/1970 | Campbell | 178/6 |
| 3,676,580 | 7/1972 | Beck | 178/DIG. 13 |
| 3,733,430 | 5/1973 | Thompson | 178/DIG. 13 |
| 3,757,035 | 9/1973 | Sullivan | 178/6 |

*Primary Examiner*—Howard W. Britton
*Assistant Examiner*—Michael A. Masinick
*Attorney, Agent, or Firm*—Philip M. Hinderstein

[57] ABSTRACT

A method and apparatus for conducting a television audience survey in which a channel switch position detector and a television receiver on/off detector is attached to each television receiver in a sampled household and the information obtained from the channel switch position detectors is transmitted as a pulse train signal via a transmission media to a survey center. At the survey center, the pulse train signal is demodulated to recover the transmitted information which is processed in a computer as statistical data.

4 Claims, 5 Drawing Figures

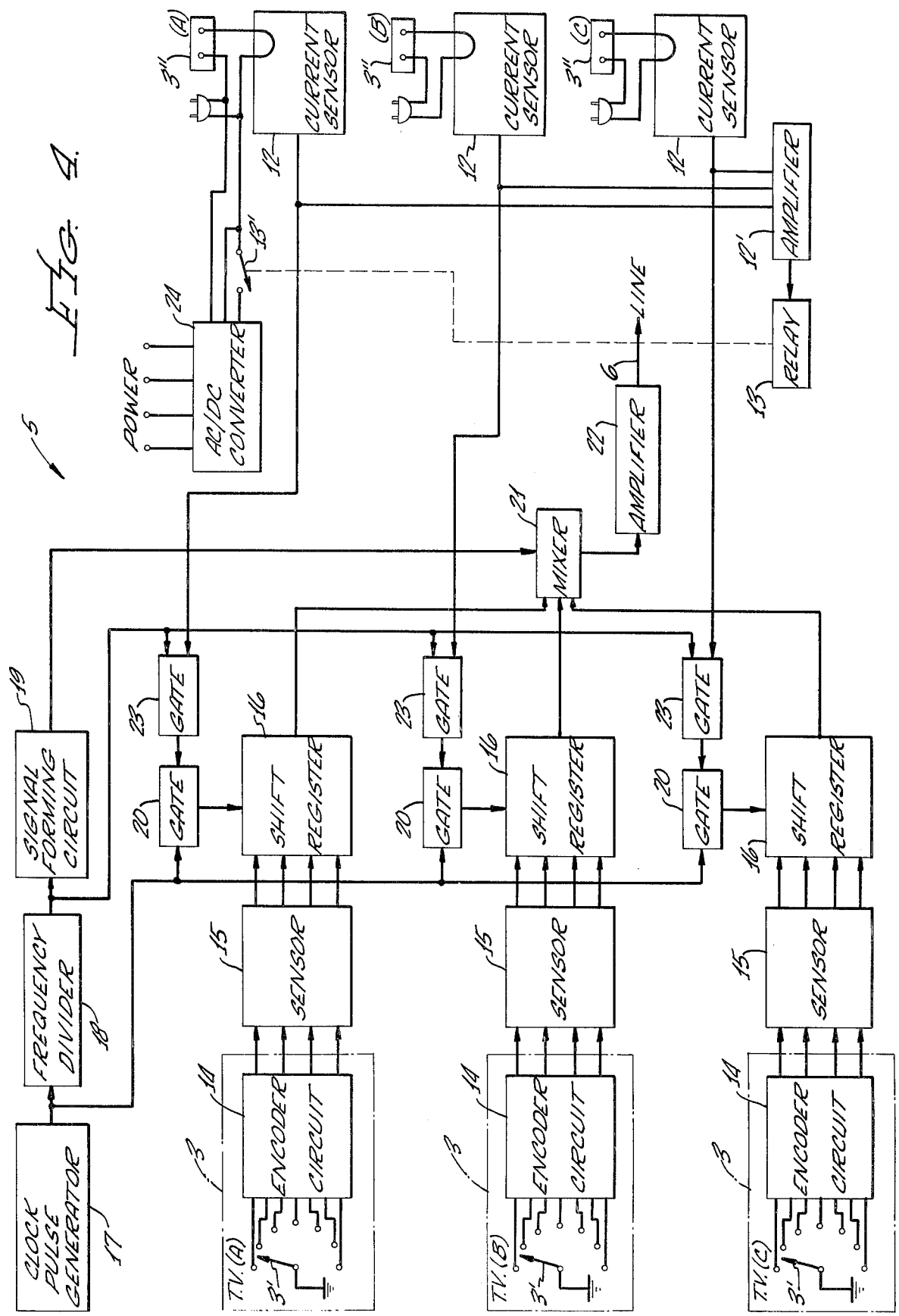

SYSTEM FOR CONDUCTING A TELEVISION AUDIENCE SURVEY

BACKGROUND OF THE INVENTION

1. Field of the Invention.

The present invention relates to a system for conducting a television audience survey and, more particularly, to a method and apparatus for transmitting channel switch position information from sampled television receivers to a central processing center.

2. Description of the Prior Art.

Television audience rating statistics are very important for broadcasting stations and sponsors. Therefore, it is a common method of collecting these statistics that investigators ask questions of sampled families and collect answers. However, this is a slow and uncertain way of collecting the desired information. As a result, several systems to collect such statistics have been proposed and several kinds of equipment are used.

In the prior art, equipment for conducting a television audience survey consists of recording machines which are attached to television receivers, which recording machines are periodically gathered to read and collect statistics. The recording machines attached to the television receivers include means for detecting the power switch condition and for detecting the channel switch number by identifying the switch angle or the frequency of the receiver local oscillator. Furthermore, means for recording this information on a tape or plate driven by a clock is known.

In these systems, there are several defects in that it is complicated and expensive to record the data within an accurate time and it is expensive and time-consuming to collect the records and manually read them out. Moreover, the reliability of this statistics is degraded because of the absence of samples which are impossible to collect and also because the manual reading out of the data causes errors. It is also a substantial deficiency that collecting the data and reading and calculating it takes a long time so that the results of the survey do not respond quickly to sponsors or television broadcasting stations.

Furthermore, television receivers are now very common and many families have plural television receivers. In these cases, the prior method, which is based on a single receiver, does not always show suitable statistics of all of the television receivers which broadcasting stations and sponsors desire.

SUMMARY OF THE INVENTION

According to the present invention, these problems are solved by providing a system for conducting a television audience survey which makes possible real time processing. With the present system, accurate statistics concerning a television audience are obtained economically, reliably, and inexpensively and it is possible to obtain statistics from each television receiver from a family having plural television receivers.

In accordance with the present invention, a simple detector and transmitter are positioned at a sampled television set. This transmitter is connected to a central station by a communication line. In the central station, the communication line is directly connected to a receiver and a statistic processing system.

The detector and transmitter which are positioned at the sampled television set are very simple. The detector obtains information of the receiver power switch condition and the channel switch position and the information is changed to a train of pulse signals to send through the communication line. For the communication system, a public telephone system may be used. The pulse signal is conducted to the survey center where the signal is demodulated to be connected to a data processing system, i.e. a computer. The data input is processed and statistics of the television audience is provided at the output of the computer. It is also possible to obtain statistics of any state of an angle.

A specific advantage of the present invention is that for a family having plural television receivers, a suitable data collection is available. For such a family, plural detectors and a single transmitter are included and the information from all the television sets is collected and transmitted as a train of pulses.

OBJECTS

It is therefore an object of the present invention to provide a system for conducting a television audience survey.

It is a further object of the present invention to provide a method and apparatus for transmitting television switch position information from sampled television receivers to a central processing center.

It is a still further object of the present invention to provide a system for conducting a television audience survey which makes possible real time processing.

It is another object of the present invention to obtain accurate statistics for a television audience rating.

It is still another object of the present invention to provide a system for conducting a television audience survey economically.

Another object of the present invention is to avoid the manual treatment of collected data when conducting a television audience survey.

Still another object of the present invention is the provision of a system for conducting a television audience survey from a family having plural television receivers.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 3 is a schematic diagram of the diode encoder of the detector of FIG. 2;

FIG. 4 is a schematic block diagram of the detector and transmitter portion of the embodiment of FIG. 1 for a family having plural television receivers.

DESCRIPTION OF THE PREFERRED EMBODIMENTS

Figure 1:
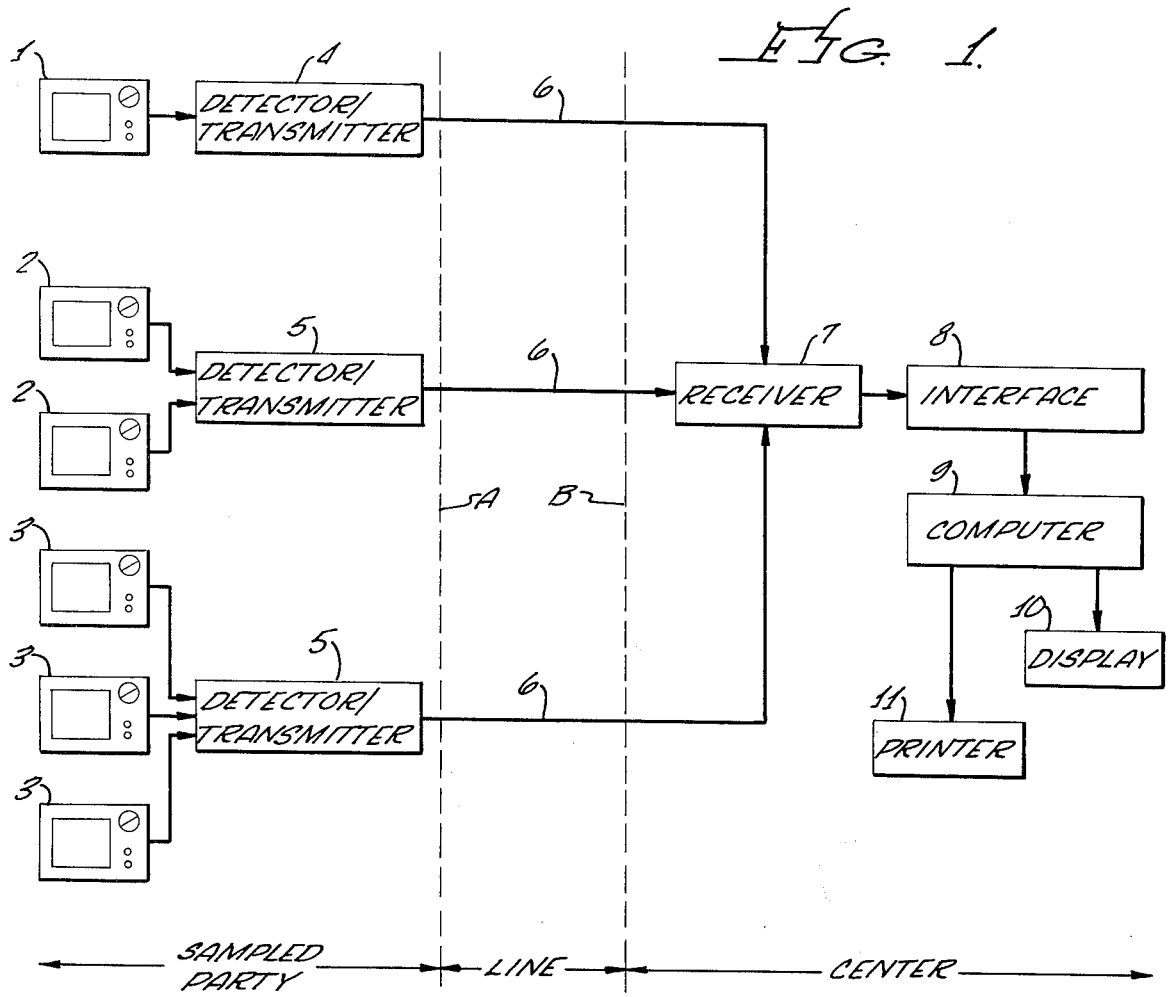
FIG. 1 is a schematic block diagram showing an embodiment of the present invention.

Referring now to the drawings and, more particularly, to FIG. 1 thereof, the present system for conducting a television audience survey is divided into three portions by the dotted lines A and B. Left of line A are the sampled families, between lines A and B are the communication lines, and to the right of line B is the survey center. The television receiver of a sampled family having a single receiver is designated by the numeral 1. The television receivers of families having plural receivers are designated 2 and 3. The operating condition (i.e. on or off) and information of the selected channel of television receivers 1, 2 and 3 are detected and transmitted by detectors and transmitters 4 and 5, the former receiving information from a single receiver and the latter receiving information from two or three television receivers. From transmitters 4 and 5, pulse code signals at the rate of 50 bits per second are transmitted to transmission lines 6. Transmission lines 6 from the various sampled families are gathered at the survey center and are connected to a receiving system 7. In receiving system 7, the signals are demodulated and successively selected for conduction to a computer 9 through an interface 8. Computer 9 processes the data and the results are displayed on a display 10 or printed out from a printer 11.

Figure 2:
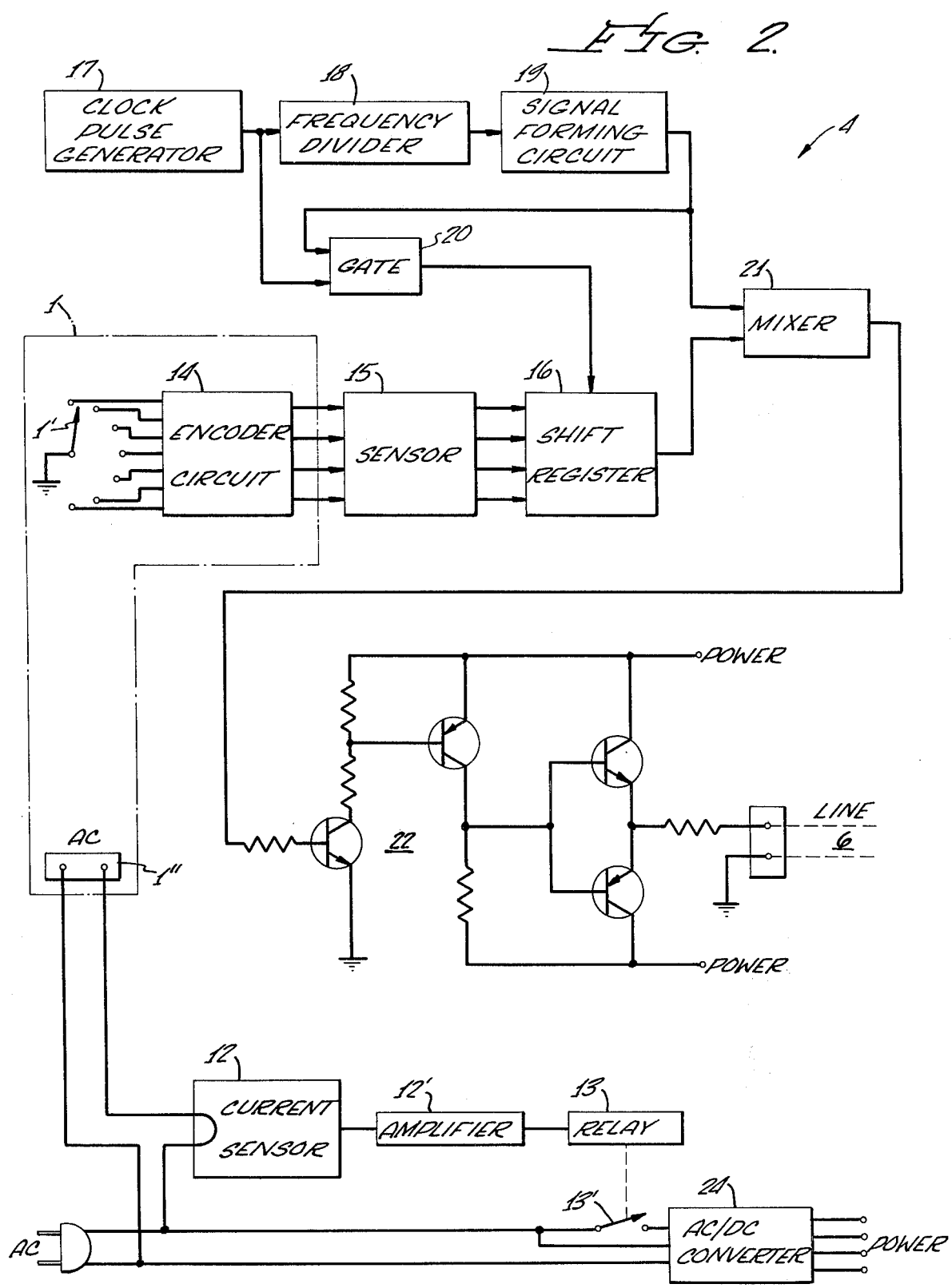
FIG. 2 is a schematic block diagram of the detector and transmitter portion of the embodiment of FIG. 1.

Referring now to FIG. 2, there is shown the details of detector and transmitter 4 of FIG. 1 for a sampled family having a single television receiver. The dotted line 1 represents the television receiver and only its channel switch 1' and AC power switch 1" are emphasized. When power switch 1" of receiver 1 is turned on, the power current is detected by a current sensor 12 which energizes a relay coil 13 via an amplifier 12'. Relay coil 13 closes a switch 13' which permits AC power to flow via an AC to DC converter 24 to the detector and transmitter circuits.

The angle of channel switch 1' of television receiver 1 is detected by a diode encoder circuit 14. Diode encoder circuit 14 may be any well-known encoder circuit for converting a selected one of eight inputs into a four-digit binary code. A typical diode encoder circuit 14 is shown in FIG. 3 and includes a plurality of diodes, each of which is biased to a certain reference potential, the diodes being arranged into eight inputs, plus an open position, and four outputs. When channel switch 1' is connected to one of the eight positions, a binary code on the four outputs is generated corresponding to that position.

Returning to FIG. 2, a sensor 15 detects the code from encoder 14 and transmits it directly to a shift register 16. Sensor 15 acts as a buffer between diode encoder 14 and shift register 16 so that when switch 1' is in an intermediate position, i.e. when channel switch 1' is moving or when receiver 1 is set on a position when no broadcasting exists, sensor 15 does not transmit the code from encoder 14 to shift register 16.

Detector and transmitter 4 includes a clock pulse generator 17 which generates clock pulses synchronized to the commercial power frequency. The clock pulses from generator 17 are applied to one input of a mixer 21 via a 1/12 frequency divider 18 and a synchronizing signal forming circuit 19. The output of circuit 19 is applied to one input of a gate circuit 20 which receives a signal from clock pulse generator 17 at its other input. The output of gate circuit 20 is applied to shift register 16. The output of shift register 16 is added to the synchronizing signal from circuit 19 in mixer 21, the output of which is conducted to an amplifier 22 which adjusts the signal level and transmits the signal to line 6.

In operation, synchronizing signal forming circuit 19 establishes a characteristic pulse train which may be detected in receiving system 7 and utilized to distinguish valid incoming data. While any suitable pulse code may be utilized, signal forming circuit 19 produces six "on" pulses following two "off" pulses for every twelve clock pulses, leaving four additional clock intervals for transmission of the information stored in register 16 before divider 18 restarts the cycle. That is, after frequency divider 18 generates an output pulse, synchronizing signal forming circuit 19 waits two clock intervals and then generates six on pulses. Gate 20 includes a counting circuit which, upon detection of these six on pulses from circuit 19, opens gate 20 permitting four clock pulses from generator 17 to pass to shift register 16 where the stored information is changed to a pulse train which is added to the six on pulses from circuit 19 in mixer 21 and transmitted to line 6 via amplifier 22.

Referring now to FIG. 4, there is shown the details of detector and transmitter circuit 5 which is positioned in a household having plural television receivers 3, designated A, B and C. Circuit elements in detector and transmitter circuit 5 which correspond to identical circuit elements in detector and transmitter circuit 4, have been given the same identifying numeral and to the extent that such circuit elements function the same, a detailed explanation is omitted.

When the power switch 3" of at least one of receivers 3 is switched on, the corresponding current sensor 12 detects the power current and energizes relay 13 via amplifier 12', as explained previously. Relay coil 13 closes switch 13' applying power simultaneously to all circuit elements. Simultaneously, the energized current sensor 12 applies a signal to a corresponding gate circuit 23 which applies the output of frequency divider 18 to the corresponding gate circuit 20. As shown in FIG. 4, the outputs of the three shift registers 16 are combined in mixer 21 with the output of synchronizing signal forming circuit 19 and the resultant pulse train is transmitted to line 6 via amplifier 22.

In the embodiment of FIG. 4, frequency divider 18 generates an output pulse after twenty clock pulses from clock pulse generator 17. After the generation of such a pulse, signal forming circuit 19 waits for two clock intervals and then produces six on pulses which are applied to mixer 21. Gate circuits 20 have counters, as described previously, but each counter is set for a different value. Thus, gate circuit 20 associated with television receiver A waits for eight pulses after being activated by gate 23 before applying the output of clock pulse generator 17 to shift register 16 to conduct the output therefrom to mixer 21. Gate 20 associated with television receiver B, waits an additional four clock pulses before applying the output of clock pulse generator 17 to its associated shift register 16 and gate 20 associated with television receiver C waits still an additional four clock pulses before applying the output of clock pulse generator 17 to its associated shift register 16. Thus, the output of mixer 21 consists of two off pulses, six on pulses, and then twelve additional pulses corresponding to the position of channel switches 3' in television receivers A, B and C. If any one or more of television receivers A, B or C is off, no data pulses will be transmitted during its respective time interval.

Figure 5:
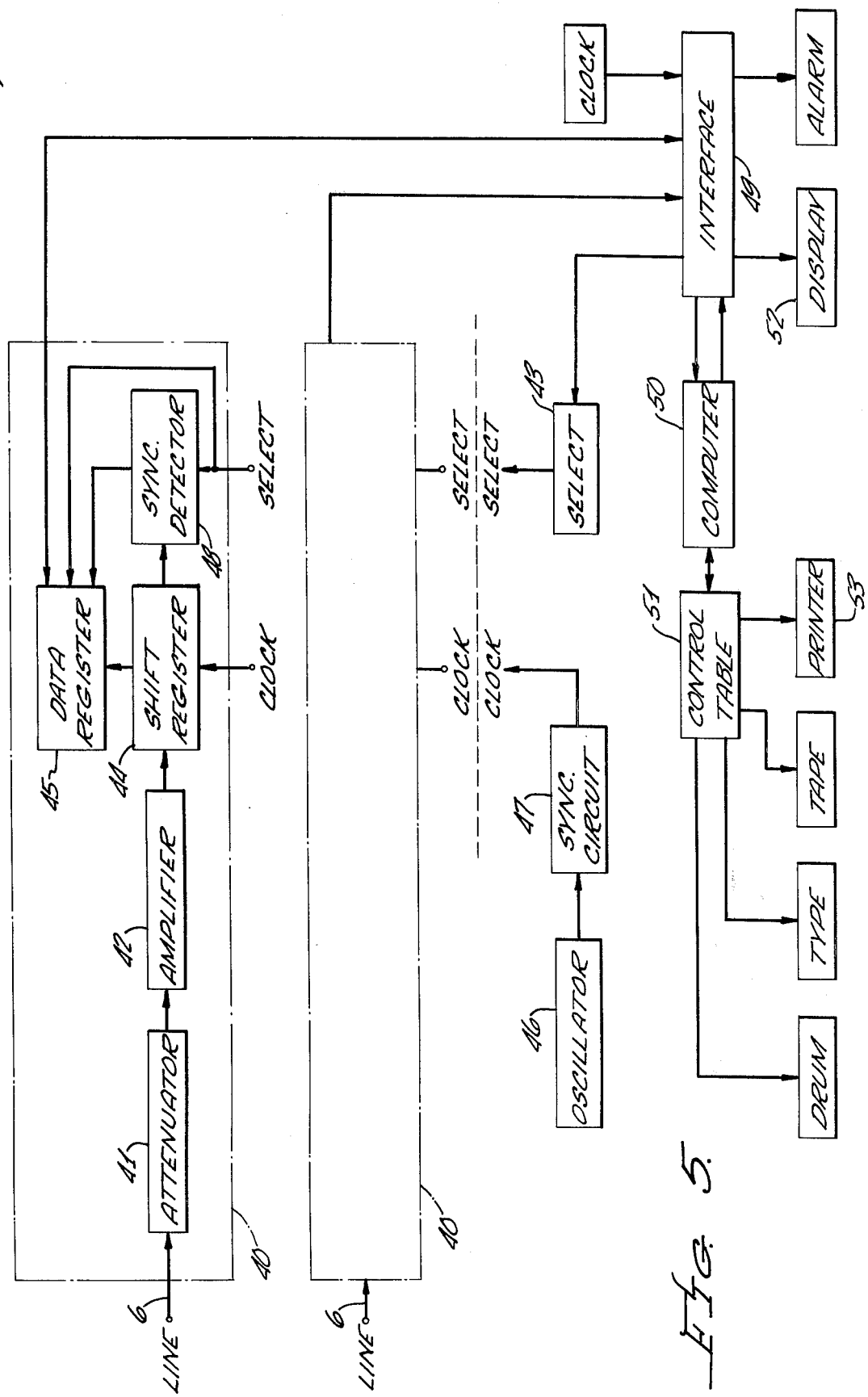
FIG. 5 is a schematic block diagram of the receiver and demodulator portion of the system of FIG. 1.

Referring now to FIG. 5, there is shown a receiver and demodulator circuit 7 which is positioned in the surveying center of FIG. 1. Signals received from the transmission lines 6 have their level adjusted in attenuators 41 and amplifiers 42 prior to conduction to the demodulating circuits. The input signal train is demodulated to parallel data in shift registers 44 controlled by clock pulses which are generated from a clock pulse generator 46 synchronized to the commercial AC power line and thereby synchronized to each transmitter in the sampled families. The output of oscillator 46 is supplied to shift registers 44 through a synchronizing signal forming circuit 47.

More specifically, the received pulses arrive at shift register 44 one by one, as they were transmitted by detectors and transmitters 4 and 5. Each register has either room for four digits for a single channel unit and room for twelve digits for a multi-channel unit. As the signal overflows from shift register 44, it is applied to a sync detector circuit 48 which has room for six digits. Remembering that each data signal is always preceded by six on pulses from signal forming circuits 19, sync detector 48 operates, when filled with on pulses, to send a signal to a data register 45 which reads out the stored digits from register 44 which now correspond to the transmitted data pulses. Signal forming circuit 47 ensures that the incoming data pulses are transmitted through shift registers 44 at the same rate that they are clocked into line 6 by clock pulse generator 17.

The stored data in data registers 45 are read out by a selecting pulse from a select circuit 43 and applied to a computer 50 via an interface circuit 49. Computer 50 is controlled by a control table 51 and processes the data through interface 49. The results are displayed on a display 52 or printed out by a printer 53 or stored in a drum or on tape by conventional means for use by sponsors and broadcasting stations.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. Apparatus for conducting a television audience survey comprising:
   means operatively coupled to the channel selector switch of each television receiver in a sampled household for detecting the position thereof and for generating a pulse code signal including a plurality of data bits indicative of said position;
   means for generating a characteristic train of identification pulses;
   means for adding and transmitting over a transmission means said train of identification pulses followed by said pulse code signal;
   means operatively coupled to the on/off switch of each said television receiver for detecting the operation thereof and for automatically activating said channel selector switch position detecting means, said identification pulses generating means, and said adding and transmitting means when a said television receiver is turned on so as to automatically and continuously transmit over said transmission means said train of identification pulses and said pulse code signal for each television receiver which is on;
   means at a survey center connected to said transmission means for receiving information thereon and responsive to the occurrence of said characteristic train of identification pulses for demodulating received pulse code signals; and
   computer means coupled to said receiving and demodulating means for processing said demodulated pulse code signals.

2. Apparatus according to claim 1 wherein said receiving and demodulating means comprises:
   data storage means;
   means for receiving said information from said transmission means; and
   means responsive to the occurrence of said characteristic train of identification pulses for transferring said pulse code signals from said receiving means to said data storage means, the output of said data storage means being applied to said computer means.

3. Apparatus according to claim 1 for conducting a television audience survey in a household having plural television receivers further comprising:
   plural channel selector switch position detecting means, one for each of said television receivers, for generating pulse code signals indicative of the positions of the channel selector switches of said plural television receivers, said adding and transmitting means being responsive to said plural channel selector switch position detecting means and said identification pulses generating means for serially adding and transmitting after said characteristic train of identification pulses the pulse code signals from each of said television receivers.

4. Apparatus according to claim 3 further comprising:
   plural operation detecting means, one for each of said television receivers, coupled to the on/off switches of respective television receivers in said sample household, each said operation detecting means automatically activating its associated channel selector switch position detecting means, identification pulses generating means, and said adding and transmitting means when its respective television receiver is turned on.

* * * * *